No. 866,944.  
PATENTED SEPT. 24, 1907.
G. H. MAAS.  
BOX FASTENER AND SEAL THEREFOR.  
APPLICATION FILED JAN. 11, 1906.
2 SHEETS—SHEET 1.
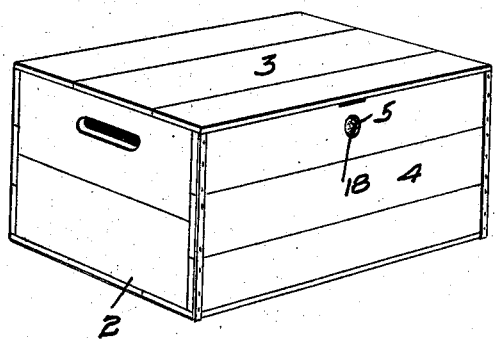
FIG. 1.
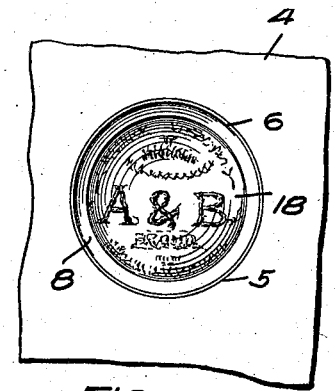
FIG. 2.
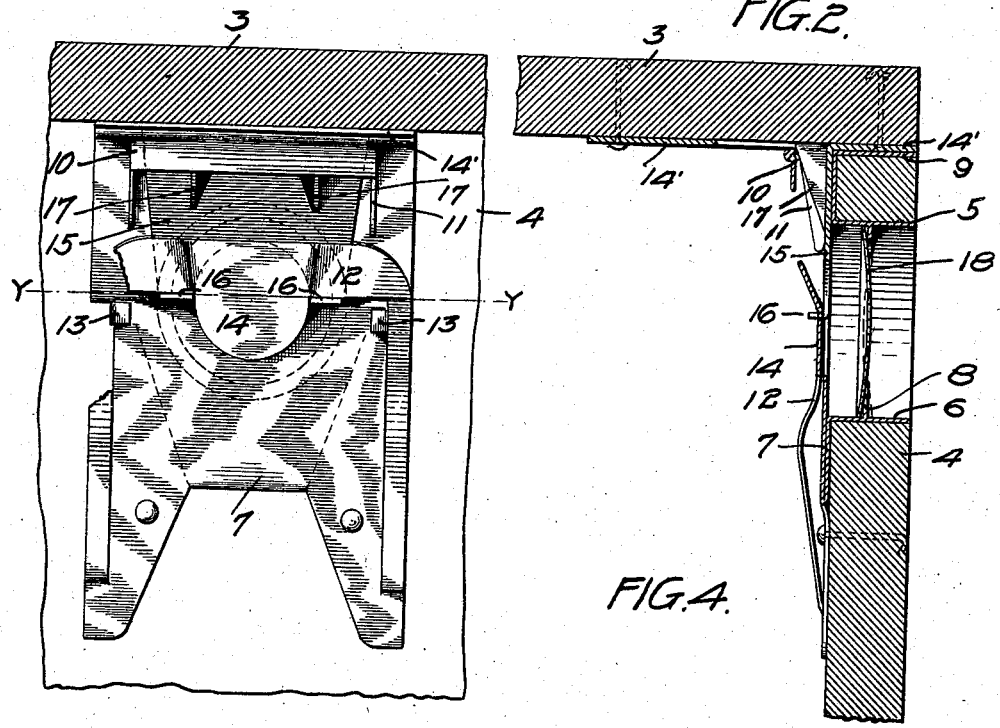
FIG. 3.
FIG. 4.
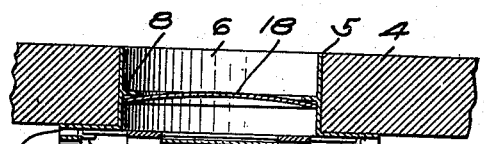
FIG. 5. Y-Y
WITNESSES
INVENTOR  
GEORGE H. MAAS  
BY  
Paul & Paul  
HIS ATTORNEYS No. 866,944.

PATENTED SEPT. 24, 1907.

G. H. MAAS.
BOX FASTENER AND SEAL THEREFOR.
APPLICATION FILED JAN. 11, 1906.

2 SHEETS—SHEET 2.

WITNESSES

INVENTOR
GEORGE H. MAAS
BY
HIS ATTORNEYS

UNITED STATES PATENT OFFICE.

GEORGE H. MAAS, OF FARGO, NORTH DAKOTA.

BOX-FASTENER AND SEAL THEREFOR.

No. 866,944.      Specification of Letters Patent.      Patented Sept. 24, 1907.

Application filed January 11, 1906. Serial No. 295,544.

*To all whom it may concern:*

Be it known that I, GEORGE H. MAAS, of Fargo, county of Cass, State of North Dakota, have invented certain new and useful Improvements in Box-Fasteners and Seals Therefor, of which the following is a specification.

In shipping bottled goods it is customary to use cases returnable when empty, and place suitable marks, either figures or letters thereon, to indicate to the shipper when the empty case is returned who the purchaser was, in order that appropriate credits may be made for the empty bottles and the missing ones charged. It is also customary to provide some means for locking and sealing the case to prevent it from being tampered with by any unauthorized person. It has been found, however, an inconvenient and laborious task to place a mark on each case before it is shipped, and remove that mark when the case is returned and before it is sent out again. Furthermore, the locks and sealing devices generally used are crude and undesirable in many ways for the purpose designed.

The object, therefore, of my invention is to provide means whereby a case can be easily and quickly marked preparatory to shipping, to enable that particular case to be identified when returned, or to indicate the character or grade of its contents.

A further object is to provide means for locking and sealing the case, which will be simple and inexpensive to manufacture, easily applied to the case, and will positively prevent, through fear of detection, any tampering with the case.

My invention consists, generally, in providing a diaphragm or disk, of comparatively thin material, suitably inscribed and fitting within a socket in the wall of the case and preventing access to the locking device.

Further, the invention consists in various constructions and combinations, all as hereinafter described and particularly pointed out in the claims.

Figure 8:
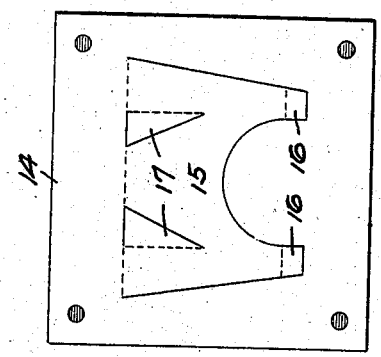
Figure 9:
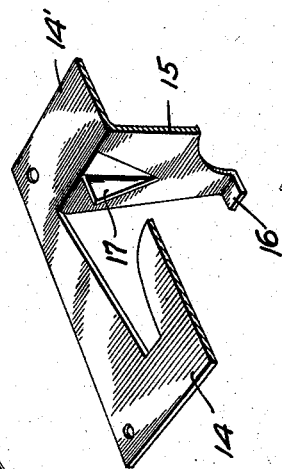
Figure 7:
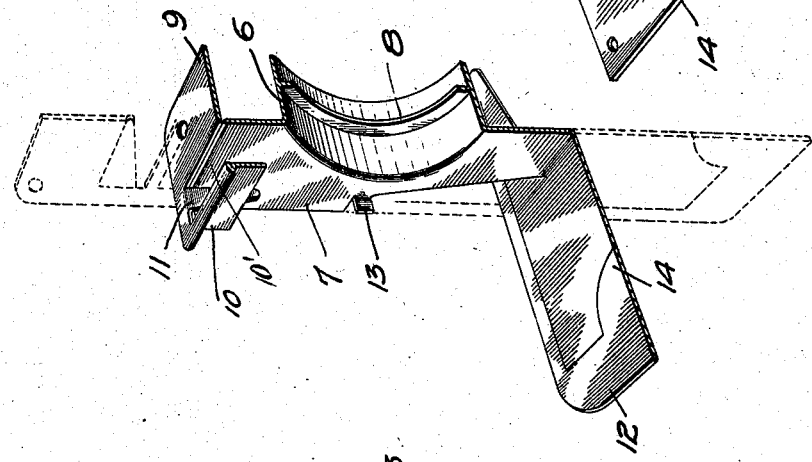
Figure 6:
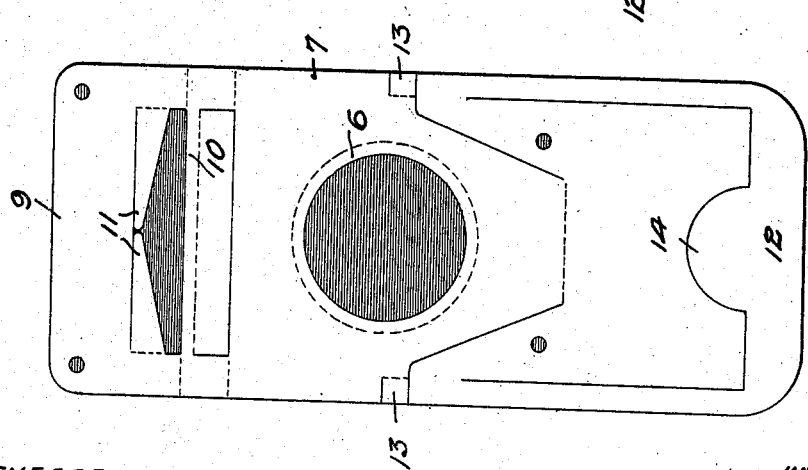

In the accompanying drawings forming part of this specification, Figure 1 is a perspective view of a case used for shipping embodying my invention. Fig. 2 is a front view of a sealing device. Fig. 3 is a sectional view of the case looking toward the front wall and showing the position of the lock thereon. Fig. 4 is a vertical sectional view through the cover and front wall and the locking mechanism. Fig. 5 is a plan section on the line *y—y* of Fig. 3. Fig. 6 is a plan view of the blank from which one member of the locking device is stamped. Fig. 7 is a perspective view showing one half of one locking member ready to be attached to the case, the original form being indicated by dotted lines. Fig. 8 is a plan view of the blank from which the other member of the locking device is stamped. Fig. 9 is a perspective view showing one-half of the locking member pressed or stamped into suitable form to be attached to the cover of the case.

In the drawing, 2 represents a suitable shipping case having a cover 3 and walls 4. A hole 5 is provided in the front wall of the case extending entirely therethrough and adapted to receive an annular flange 6 formed on a plate 7 preferably of sheet metal. The flange 6 fits snugly within the hole 5 and forms a bushing or lining therefor and is provided at a point intermediate to its ends with an annular rib 8. The upper end of the plate 7 is bent toward the left substantially at right angles to its middle portion and then bent back upon itself toward the right, the end of the bent portion extending across and projecting outwardly beyond said plate to form a flange 9 that is adapted to be secured to the upper edge of the vertical wall of the box. The manner of folding the end of the plate is indicated by the dotted lines in Fig. 6.

A flange 10 is pressed out of the lower portion of the fold in the plate and tongues 11 are formed in a similar manner from the upper portion of the fold to form a guide-way 10′ through which the locking hook passes, as will hereinafter appear. The lower end of the plate 7 is inwardly and upwardly turned and a loop 12 is stamped therefrom and adapted to be turned up against the middle portion of the plate and secured thereto by the lugs 13. This loop 12 may be formed in any suitable way, preferably by punching or stamping it out of the lower end of the plate. The plate 7 is secured on the front wall of the box by any suitable means with the flange 6 projecting into the hole in the wall and permitting access to the loop 12 therethrough. A depending tongue 14 is formed on the loop 12 in position to be engaged by a suitable instrument for the purpose of separating the loop from the hook on the cover to allow the case to be opened.

In Figs. 8 and 9 I have shown a cover plate 14′ adapted to be secured to the under side of the cover by suitable means and having a depending tongue 15 punched or pressed out of said plate and terminating in inwardly turned hooks 16 which engage the loop 12 to lock the cover in its closed position. Triangular lips 17 are preferably formed in the tongue 15, and are adapted to slip down into the guide 10′ and be wedged therein and prevent movement of the tongue 15 and the accidental disengagement of its hook from the loop 12. When the case cover is closed the tongue 15 will slip down through the guide 10′ and the loop 12 will have sufficient spring to allow the hooks 16 to slip down sufficiently to spring into the opening in the loop and prevent the cover from being raised until the loop has been disengaged from the hook. As shown in Fig. 4 the point of engagement of the hooks 16 with the loop 12 will be opposite the hole 5 and when the said hole is unobstructed, access may be had conveniently through it to press the loop 12 off the hooks 16 and allow the cover to be raised. With the exception of the bushing 6 the locking member on the wall of the case may be formed from one piece of sheet metal, though if preferred, the part including the guide way 10' may be separately formed and secured to the plate 7. The locking member on the cover is preferably, as shown, made from a single piece of metal.

To prevent the hooks and loop from being tampered with when the case is closed I provide a thin flexible disk 18, preferably of tin and adapted to be slipped into the bushing 6 and fit snugly therein, the disk being of greater diameter than the bushing and bent with its middle portion projecting beyond the plane of its edges so that when it is inserted into the bushing the spring of the metal will cause the edge of the disk to press snugly against the wall of the bushing and hold the disk firmly in place and prevent a thin bladed instrument from being inserted between the said edge and the bushing, and it will thus be impossible for anyone to remove the disk and obtain access to the lock without mutilating or damaging the disk to such an extent that the work would be instantly detected. When the disk is inserted from the inside its convex surface will be on the outer side and the disk will be between the locking plate 7 and the rib 8 and the case will be effectually sealed until the disk is broken. The face of the disk is suitably marked to enable the shipper to identify the box or case when returned. If preferred, the disk may be inserted into the bushing from the outside and will immediately assume a convex form with its middle portion pressed in beyond the plane of its edge and pressure on the middle portion of the disk will only serve to force its edge more snugly against the walls of the bushing, and an instrument cannot be inserted between the edge and the wall without breaking or tearing the disk and indicating to the inspector that the case has been tampered with.

I have found that a disk made in this way and slipped into a circular or polygonal socket does not require a groove to hold it in place, but if made of thin spring material and the middle portion is pressed in out of the plane of the edge that it will be held even more securely than when an annular groove is provided to receive the edge of the disk. The reason for this is that the disk fits so snugly against the bushing and forms so small an angle therewith that a knife blade or similar tool cannot be inserted between the edge of the disk and the wall. Pressure on one edge of a convex surface only serves to force its opposite side more snugly against the bushing and I have found that it is impossible when the disk is properly fitted to obtain access to the case without puncturing the disk. This may be done by the person receiving the case by means of a sharp-pointed instrument which when thrust through the disk will contact with the lock 14 and push the loop 12 out of engagement with the hook 16, the cover may then be raised. When the case is returned to the shipper the disk will still be in place in the bushing and by means of the figures or marks thereon the shipper can easily identify the case and give the customer proper credit therefor.

I claim as my invention:

1. The combination with a shipping case having a hole in its side wall a bushing fitting therein and a cover for said case, of a thin flexible disk suitably marked inserted into said bushing and having its middle portion pressed in beyond the plane of its edge, and a cover lock accessible through said hole when said disk is punctured.

2. The combination with a shipping case having a hole in its side wall a bushing fitting therein and a cover for said case, of a metallic disk of comparatively thin material fitting within said bushing and having its edge contacting with the same and its middle portion pressed inwardly beyond its edge, and a hook device mounted on said cover, a loop secured on the case wall and engaged by said hook, and said loop and hook being opposite and contiguous to said disk, for the purpose specified.

3. In a sealing device for shipping cases, a ring or bushing in combination with a diaphragm of comparatively thin material fitting therein and having a suitably marked surface, its edge contacting with said bushing and its middle portion pressed in beyond the plane of its edge, said bushing having a smooth inner surface of uniform diameter throughout its length, substantially as described.

4. A sealing device for shipping cases comprising a bushing or ring having a smooth interior surface, and a disk suitably marked and of comparatively flexible material fitting within said bushing and having its edge contacting therewith, the middle portion pressed in beyond the plane of the edge thereof whereby pressure on the middle portion of said disk will force its edge more snugly against the surface of said ring, substantially as described.

5. A sealing device for shipping cases comprising a bushing having an interiorly arranged annular rib intermediate to its ends, and a disk suitably marked of flexible material fitting within said bushing and having its edge contacting therewith said disk assuming a convex form in said bushing, whereby its middle portion is pressed in beyond the plane of the edge of the disk.

6. In a shipping case, the combination with a vertical wall having an orifice extending therethrough, a bushing fitting within said orifice and a cover for said case, of a plate secured to said vertical wall and provided with a loop, a second plate secured to said cover and provided with a depending tongue having a hooked lower end to enter said loop, and a disk of flexible material suitably marked fitting within said bushing and opposite and contiguous to said hook and loop, for the purpose specified.

7. A shipping case having a suitable cover, in combination with a vertical wall having a hole or orifice, a bushing fitting therein and provided with an annular rib intermediate to its ends, of a loop device secured to said wall, a tongue secured to said cover and having a hooked end to enter said loop, and a disk suitably marked fitting within said bushing upon either side of said rib and adapted to be punctured to obtain access to said loop and hook, substantially as described.

8. In a shipping case having a suitable cover and a wall provided with an orifice, of a plate secured to said wall and having a loop and a guide provided thereon, a second plate secured to said cover and having a depending tongue and a lip to enter said guide, and said tongue having a hook at its lower end to engage said loop, and a disk adapted to bear suitable marks and composed of flexible material capable of being punctured and fitting within said orifice near said loop and hook, substantially as described.

9. The combination, with a shipping case having a cover and lock device secured on the wall of said case and on said cover, said wall having an opening contiguous to said lock device, and a convex disk of flexible spring material fitting within said opening and preventing access to said lock, substantially as described.

10. In a device of the class described, the combination, with a case having a cover and a lock device therefor, the wall of said case having a hole contiguous to said lock device, a bushing fitting within said hole, and a disk convex in form fitting within said bushing and normally preventing access to said lock device, the edge of said disk pressing against said bushing and pressure on the middle portion of said disk only serving to force its edge more closely against the wall of said bushing, substantially as described.

11. The combination, with a shipping case having a hole in its side wall a bushing fitting therein, a cover for said case, a lock device for said cover, and a disk of flexible spring material of greater diameter than said bushing and adapted to be fitted therein and assume a convex form with its middle portion pressed in beyond the plane of its edges and said disk concealing said locking device and normally preventing access thereto, substantially as described.

12. A sealing device comprising a shell or bushing and a disk convex in form fitting therein, the edge of said disk pressing against the inner wall of said shell, and pressure on the middle portion of said disk only serving to force its edge more closely against the wall of said shell.

13. The combination, with a receptacle having a hole in its wall, of a disk convex in form fitting within said hole, the edge of said disk pressing against the wall inclosing said hole, and pressure on the middle portion of said disk only serving to force its edge more closely against said wall, substantially as described.

In witness whereof, I have hereunto set my hand this 5th day of January 1906.

GEORGE H. MAAS.

Witnesses:
RICHARD PAUL,
C. MACNAMARA.